(No Model.)
J. C. BEACH.
CAR WHEEL.
No. 342,169. Patented May 18, 1886.
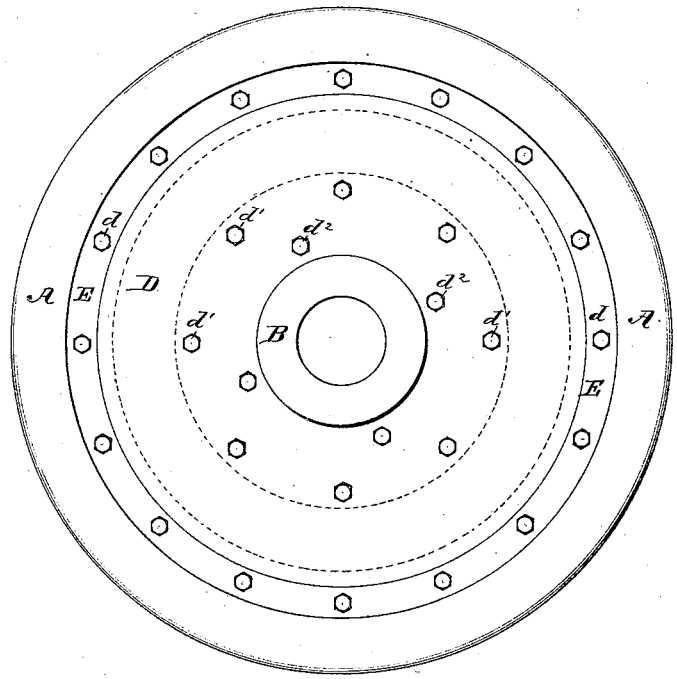
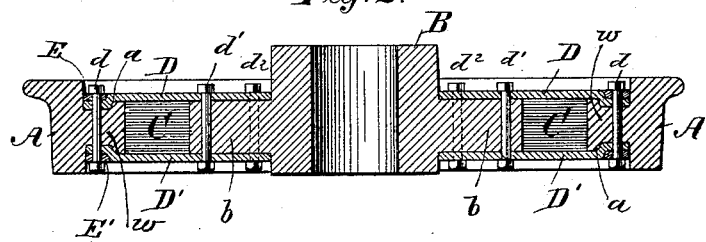
Witnesses:
Robt. F. Gaylord
Robt. H. Duncan
Inventor
James C. Beach
N. PETERS, Photo-Lithographer, Washington, D. C.

UNITED STATES PATENT OFFICE.

JAMES C. BEACH, OF BLOOMFIELD, NEW JERSEY.

CAR-WHEEL.

SPECIFICATION forming part of Letters Patent No. 342,169, dated May 18, 1886.

Application filed March 31, 1886. Serial No. 197,232. (No model.)

*To all whom it may concern:*

Be it known that I, JAMES C. BEACH, of Bloomfield, in the county of Essex and State of New Jersey, have invented certain new and useful Improvements in Car and Locomotive Wheels; and I do hereby declare that the following is a full, clear, and exact description of the invention, which will enable others skilled in the art to which it appertains to make and use the same.

The present invention relates to that class of car and locomotive wheels in which the tire is removably secured to the body of the wheel by mechanical means.

The object of the invention is to provide a safe and secure attachment of the tire to the body of the wheel of such kind that the tire can be readily removed without material injury to the body; and the invention consists, generally, in locking the peripheries of the side plates of the body of the wheel over flanges formed on a web of the tire and supporting the joint by annular rings bearing against the side plates and adjacent the tire, and secured in place by bolts or rivets passing through the wheel.

The invention is illustrated in the accompanying drawings, in which Figure 1 is an elevation of the inner side or face of the wheel, and Fig. 2 is a central section of the same.

In the drawings, A represents the tire, preferably made of cast-steel by forging or rolling, and provided with an annular web, *w*, projecting from its inner surface toward the hub of the wheel.

*a a* are flanges projecting laterally from the web, preferably near its end.

B is the hub of the wheel, cast or forged from iron or steel, and provided with a centrally-located annular flange or web, *b*, of the desired thickness.

D and D' are side plates, preferably of wrought-iron or steel, and having their inner and outer peripheries respectively connected with the hub and the tire.

C is a core or ring inclosed laterally by the side plates and vertically by the hub and the tire.

E and E' are annular strengthening-rings of steel or wrought-iron.

The several parts above described, and shown in the drawings, after having been shaped to the proper relative sizes and proportions to fit together to form the wheel, may be conveniently brought together and united as follows: The core C may first be forced into position between the hub and tire. Then the plates D and D' are brought into their respective positions, their inner peripheries overlapping the web *b* of the hub, and their outer peripheries overlapping the web *w* of the tire, and shouldered over its lateral flanges *a*, forming recesses between the under side of the tire and the shoulders of the plates. The strengthening-rings E and E' are forced into these recesses, and these several parts are secured together, preferably by three series of bolts—two passing through the side plates and the web of the hub, and one passing through the rings E and E', the side plates, and the web of the tire. These series of bolts are designated in the drawings, respectively, by the letters $d^2$, $d'$, and $d$, and the bolts are drawn home and secured by nuts, whereby the several parts of the wheel are brought into close contact and are securely united together.

It is remarked that as this invention relates specially to the means of uniting the side plates of the wheel to the tire and to the strengthening of this union or joint, it is immaterial in what special way the side plates are united to the hub, or whether a central core is employed or omitted.

The drawings show a construction of hub in which the side plates can be employed either with or without the central core. In case the central core is used the central web on the hub might be omitted, and a flange formed outside of and overlapping one of the side plates be substituted in its place, in which construction the core should extend to the hub and be in contact therewith, and would furnish a bearing for the side plates, and the core, side plates, and flange be securely bolted together. When a core is used, it is preferred that it be made of compressed paper or other slightly elastic and strong material.

In the construction described and shown the tire is effectually secured to the body of the wheel by shouldering or bending the side plates near their outer peripheries over the lateral flanges formed on the web of the tire. This would render the union of these parts secure were it not for the liability of breakage of the side plates between their shoulders and the under side of the tire, where they are subjected to great strain. It is to greatly decrease this liability and to make this part of the wheel secure and safe that the rings E and E' are fitted closely into the recesses between the tire and the shoulders of the side plates. By passing the series of bolts $d$ through the rings E and E', the side plates, and the web of the tire, and drawing and holding these parts into close contact, the union of the body of the wheel and the tire is made secure and strong.

What is claimed as new is—

The combination, in a car-wheel, of a flanged web projecting inwardly from the tire and side plates shouldered over the flanged web, with annular rings located between the tire and the shoulders of the plates, and secured in place by bolts passing through the wheel substantially as and for the purpose set forth.

JAMES C. BEACH.

Witnesses:
ROBT. H. DUNCAN,
H. F. NEWBURY.